(12) United States Patent
Marchetti et al.

(10) Patent No.: US 8,311,937 B2
(45) Date of Patent: *Nov. 13, 2012

(54) CLIENT SUPPORTED MULTIPLE PAYMENT METHODS SYSTEM

(75) Inventors: John N. Marchetti, Monrovia, MD (US); Matthew Mullen, Danville, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/030,771

(22) Filed: Feb. 13, 2008

(65) Prior Publication Data

US 2009/0112658 A1    Apr. 30, 2009

Related U.S. Application Data

(63) Continuation-in-part of application No. 11/929,033, filed on Oct. 30, 2007.

(51) Int. Cl.
*G06Q 20/00* (2012.01)
(52) U.S. Cl. .................... 705/39; 705/7; 705/35
(58) Field of Classification Search ........... 705/7, 30–45
See application file for complete search history.

(56) References Cited

U.S. PATENT DOCUMENTS

| | | |
|---|---|---|
| 5,790,677 A | 8/1998 | Fox et al. |
| 5,826,241 A | 10/1998 | Stein et al. |
| 5,850,446 A | 12/1998 | Berger |
| 5,898,777 A | 4/1999 | Tycksen et al. |
| 5,956,695 A | 9/1999 | Carrithers et al. |
| 6,012,048 A | 1/2000 | Gustin et al. |
| 6,032,133 A | 2/2000 | Hilt et al. |
| 6,208,973 B1 | 3/2001 | Boyer et al. |
| 6,292,789 B1 | 9/2001 | Schutzer |
| 6,308,887 B1 | 10/2001 | Korman et al. |

(Continued)

FOREIGN PATENT DOCUMENTS

WO    WO 2006/124808 A1    11/2006

OTHER PUBLICATIONS

American Express; S2S eInvoice & Pay; The Automated Invoice and Payment Solution that Drives Efficiencies and Cost Savings; EIPSFactSheet-0707; retrieved from internet Feb. 2008; <http://corp.americanexpress.com/gcs/s2s/einvoicepay/docs/S2S_eInvoicePay-Factsheet.pdf>.

(Continued)

*Primary Examiner* — Tien Nguyen
(74) *Attorney, Agent, or Firm* — Kilpatrick Townsend & Stockton LLP

(57) ABSTRACT

A method begins by providing at least one account level preference of a plurality of account level preferences based on a level of subscription. The method continues by receiving a selection of one of the at least one of the account level preference to produce a selected account level preference. The method continues by generating payables process data in accordance with the selected account level preference. The payables process data includes a list of a plurality of creditors and associated payment data. For a creditor of the plurality of creditors, the associated payment data includes at least one payment scheme for paying at least a portion of debt owed to the creditor via at least one of: a business credit card, a funds transfer, commercial paper, tangible consideration, and a debit account. The method continues by transmitting the payable process data to a payment entity device.

21 Claims, 13 Drawing Sheets

U.S. PATENT DOCUMENTS

| | | | |
|---|---|---|---|
| 6,366,893 B2 | 4/2002 | Hannula et al. | |
| 6,408,284 B1 | 6/2002 | Hilt et al. | |
| 6,609,113 B1 | 8/2003 | O'Leary et al. | |
| 6,611,818 B1* | 8/2003 | Mersky et al. | 705/40 |
| 6,704,714 B1 | 3/2004 | O'Leary et al. | |
| 6,932,268 B1 | 8/2005 | McCoy et al. | |
| 6,996,542 B1 | 2/2006 | Landry | |
| 6,999,943 B1 | 2/2006 | Johnson et al. | |
| 7,003,495 B1 | 2/2006 | Burger et al. | |
| 7,031,940 B2 | 4/2006 | Shigemi et al. | |
| 7,058,611 B2 | 6/2006 | Kranzley et al. | |
| 7,103,579 B1 | 9/2006 | Phillips et al. | |
| 7,124,937 B2 | 10/2006 | Myers et al. | |
| 7,156,294 B2 | 1/2007 | Roth | |
| 7,269,575 B1 | 9/2007 | Concannon et al. | |
| 7,313,545 B2 | 12/2007 | Degen et al. | |
| 7,321,874 B2 | 1/2008 | Dilip et al. | |
| 7,792,712 B2 | 9/2010 | Kantarjiev et al. | |
| 7,792,717 B1* | 9/2010 | Hankins et al. | 705/35 |
| 7,930,248 B1 | 4/2011 | Lawson et al. | |
| 2001/0034702 A1 | 10/2001 | Mockett et al. | |
| 2001/0037209 A1 | 11/2001 | Tarbutton et al. | |
| 2002/0023053 A1 | 2/2002 | Szoc et al. | |
| 2002/0032653 A1 | 3/2002 | Schutzer | |
| 2002/0111886 A1* | 8/2002 | Chenevich et al. | 705/30 |
| 2002/0111915 A1 | 8/2002 | Clemens et al. | |
| 2002/0116331 A1 | 8/2002 | Cataline et al. | |
| 2002/0152124 A1 | 10/2002 | Guzman et al. | |
| 2002/0194138 A1 | 12/2002 | Dominguez et al. | |
| 2003/0055792 A1 | 3/2003 | Kinoshita et al. | |
| 2003/0088462 A1 | 5/2003 | Carrithers et al. | |
| 2003/0195819 A1 | 10/2003 | Chen et al. | |
| 2004/0117302 A1* | 6/2004 | Weichert et al. | 705/40 |
| 2004/0128240 A1 | 7/2004 | Yusin | |
| 2004/0143527 A1 | 7/2004 | Benkert et al. | |
| 2004/0215560 A1 | 10/2004 | Amalraj et al. | |
| 2004/0230526 A1 | 11/2004 | Praisner | |
| 2005/0033609 A1 | 2/2005 | Yang | |
| 2005/0049974 A1 | 3/2005 | Jani et al. | |
| 2005/0096011 A1* | 5/2005 | Yoshida et al. | 455/408 |
| 2005/0119918 A1 | 6/2005 | Berliner | |
| 2005/0177494 A1 | 8/2005 | Kelly et al. | |
| 2005/0184145 A1 | 8/2005 | Law et al. | |
| 2006/0068897 A1 | 3/2006 | Sanford et al. | |
| 2006/0074799 A1 | 4/2006 | Averyt et al. | |
| 2006/0178986 A1* | 8/2006 | Giordano et al. | 705/40 |
| 2006/0206425 A1 | 9/2006 | Sharma | |
| 2006/0265298 A1 | 11/2006 | Lee et al. | |
| 2006/0266821 A1 | 11/2006 | Zajkowski et al. | |
| 2007/0016526 A1 | 1/2007 | Hansen et al. | |
| 2007/0038560 A1 | 2/2007 | Ansley | |
| 2007/0067239 A1* | 3/2007 | Dheer et al. | 705/40 |
| 2007/0124224 A1 | 5/2007 | Ayers et al. | |
| 2007/0150411 A1 | 6/2007 | Addepalli et al. | |
| 2007/0168234 A1 | 7/2007 | Rutkowski et al. | |
| 2007/0198277 A1 | 8/2007 | Philipp et al. | |
| 2007/0255669 A1 | 11/2007 | Kashanov | |
| 2007/0282743 A1 | 12/2007 | Lovelett et al. | |
| 2007/0288377 A1 | 12/2007 | Shaked | |
| 2008/0010204 A1 | 1/2008 | Rackley, III et al. | |
| 2008/0011825 A1 | 1/2008 | Giordano et al. | |
| 2008/0015985 A1* | 1/2008 | Abhari et al. | 705/42 |
| 2008/0033878 A1 | 2/2008 | Krikorian et al. | |
| 2008/0086417 A1 | 4/2008 | Bykov | |
| 2008/0133407 A1* | 6/2008 | Guillory et al. | 705/40 |
| 2008/0154769 A1 | 6/2008 | Anderson et al. | |
| 2008/0162341 A1* | 7/2008 | Zimmer et al. | 705/40 |
| 2008/0235101 A1 | 9/2008 | Piepenbrink et al. | |
| 2009/0063353 A1* | 3/2009 | Viidu et al. | 705/75 |
| 2009/0076953 A1 | 3/2009 | Saville et al. | |

OTHER PUBLICATIONS

Mastercard Advisors; Purchase Logic.

Mastercard Worldwide; Payment Gateway; MPG-Buyer 01; retrieved from internet Feb. 2008; <https://www.mastercardpaymentgateway.com/mpgpublic/pdf/buyers_sell_sheet.pdf>.

Mastercard Worldwide; Payment Gateway; MPG-Supplier 01; retrieved from internet Feb. 2008; <https://www.mastercardpaymentgateway.com/mpgpublic/pdf/supplier_sell_sheet.pdf>.

American Express, S2S eInvoice & Pay, "The automated invoice and payment solution that drives efficiencies and cost savings", EIPSFactSheet-0707, retrieved from internet Feb. 2008, 2 pages, http://corp.americanexpress.com/gcs/s2s/einvoicepay/docs/S2S_eInvoicePay-Factsheet.pdf.

Mastercard Advisors, Purchase Logic™, 2 pages.

Mastercard Worldwide, Payment Gateway, "When was the last time somebody referred to accounts payable as "a well-oiled machine"?", MPG-Buyer 01; retrieved from internet Feb. 2008, 2 pages, https://www.mastercardpaymentgateway.com/mpgpublic/pdf/buyers_sell_sheet.pdf.

Mastercard Worldwide, Payment Gateway, "There may be no short-cuts to success. But there is one to getting paid.", MPG-Supplier 0-1; retrieved from internet Feb. 2008, 2 pages, https://www.mastercardpaymentgateway.com/mpgpublic/pdf/supplier_sell_sheet.pdf.

Notice of Allowance mailed Jun. 26, 2012 in related U.S. Appl. No. 12/030,804, 33 pages.

Notice of Allowance mailed Jun. 27, 2012 in related U.S. Appl. No. 12/030,785, 27 pages.

\* cited by examiner

Payable Profile 140

| Creditor | AP type | Payment Method | Payment Terms | Financial Inst. |
|---|---|---|---|---|
| Supplier ABC | Price ≥ X | credit card | net 30 | Bank "A" |
| | Goods – Category 1 | line of credit | - | Bank "A" |
| Supplier B | All | wire transfer | per AP | Bank "A" |
| Supplier DEF | Services – Category 1 | debit account | - | Bank "A" |
| | Services – Category 2 | check | net 30 | Bank "B" |
| | Goods – Category I | credit card | per AP | Bank "C" |
| | Goods – Category II | tangible consid. | - | Entity "A" |
| | loan payment | wire | - | Bank "A" |
| Supplier D | All for date 1 through date 2 | promissory note | - | VC "1" |
| | All goods/services after date 2 | credit card | net 30 | Bank "A" |
| | pay note | check | net 15 | Bank "B" |
| | Goods – Category "a" | account credit | - | - |
| Supplier E | All others | credit card | net 45 | Bank "B" |

FIG. 5

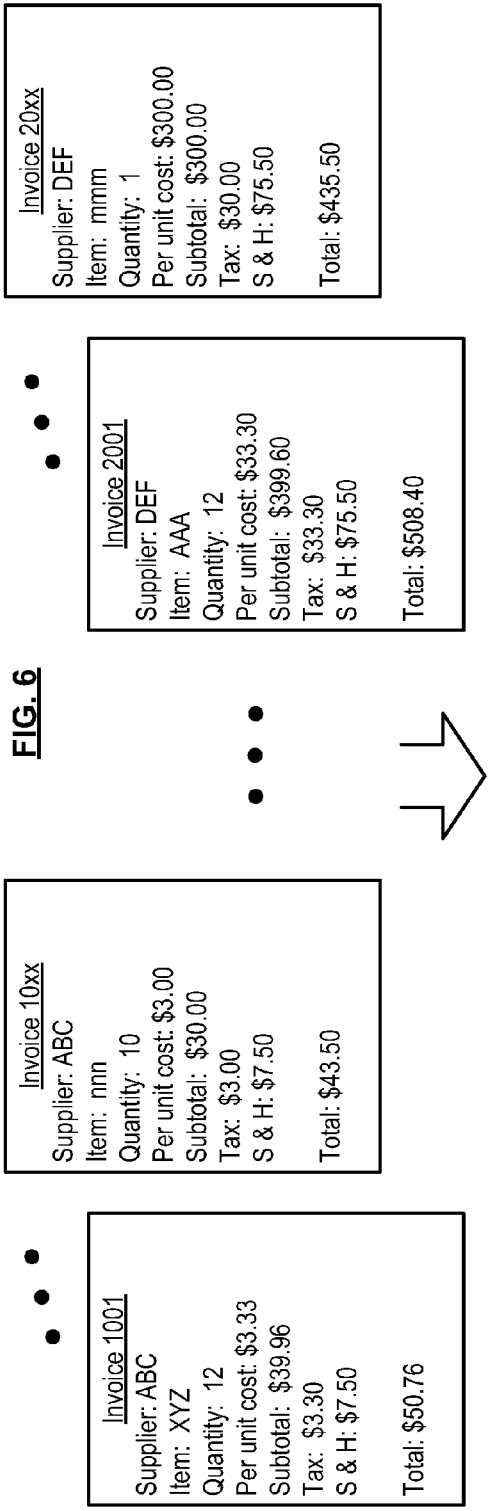

Payable Profile 140

| Creditor | AP type | Payment Method | Payment Terms | Financial Inst. |
|---|---|---|---|---|
| Supplier DEF | Services – Category 1 | debit account | - | Bank "A" |
| | Services – Category 2 | check | net 30 | Bank "B" |
| | Goods – Category I | credit card | per AP | Bank "C" |
| | Goods – Category II | tangible consid. | - | Entity "A" |
| | loan payment | wire | - | Bank "A" | accounts payable data file 150

| Supplier | Invoice # | Item | Qty | Unit $ | Subtotal | Tax | S&H | Total | Alt. pay method |
|---|---|---|---|---|---|---|---|---|---|
| DEF | 2001 | AAA | 12 | $33.30 | $399.60 | $33.30 | $75.50 | $508.40 | check, net-45 |
| | 2002 | XXX | 12 | $3.33 | $39.96 | $3.30 | $7.50 | $50.76 | no |
| | 2003 | ZZZ | 10 | $3.00 | $30.00 | $3.00 | $7.50 | $43.50 | no |
| | 2004 | mmm | 1 | $300.00 | $300.00 | $30.00 | $75.50 | $435.50 | no |
| Totals: | | | | | $769.56 | $69.60 | $166.00 | $1,038.16 | | payment data 152 for Supplier DEF

| Invoice # | Invoice Date | Item | AP type | Total | Payment Method | Payment Terms | Financial Inst. | Payment Date |
|---|---|---|---|---|---|---|---|---|
| 2001 | 1/1/08 | AAA | Services – Category 1 | $508.40 | *check* | *net 45* | *Bank "B"* | *2/15/08* |
| 2002 | 1/2/08 | XXX | Services – Category 2 | $50.76 | check | net 30 | Bank "B" | 2/2/08 |
| 2003 | 1/3/08 | ZZZ | Goods – Category I | $43.50 | credit card | per AP | Bank "C" | today |
| 2004 | 1/4/08 | mmm | Goods – Category II | $435.50 | tangible consid. | - | Entity "A" | 1/19/08 |
| | | loan | loan payment | $500.00 | wire | - | Bank "A" | today |

FIG. 7

CLIENT SUPPORTED MULTIPLE PAYMENT METHODS SYSTEM

CROSS-REFERENCE TO RELATED PATENTS

This patent application is claiming priority under 35 USC §120 as a continuation-in-part patent application of co-pending patent application entitled "System and Method for Processing Multiple Methods of Payment", having a filing date of Oct. 30, 2007, and a Ser. No. 11/929,033.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to communication systems and more particularly to financial transactions communication systems.

2. Description of Related Art

Millions of credit card transactions are accurately processed every day regardless of whether the purchaser is making a purchase in his/her home town, in another part of the world, or via the internet. Each transaction has a two stage process: authorization and clearing & settlement. Authorization is the process of approving or declining the transaction at the commencement of the transaction and clearing & settlement is the process of making the payment and accounting for the payment.

The authorization process begins when a point-of-sale terminal (physical for in-store purchases, virtual for internet purchases) reads a purchaser's credit card information and obtains a transaction amount. The terminal transmits the credit card information and the transaction amount to an acquirer bank, which combines the credit card information and the transaction amount into an authorization request. The acquirer bank transmits the authorization request to a proprietary transaction processing network (e.g., VisaNet®), which routes the authorization request to an issuer bank (i.e., the bank that issued the credit card). Alternatively, the proprietary transaction processing network may perform a stand-in review and authorization.

When the authorization request is sent to the issuer bank, the bank, or a designated third party, reviews the request and approves or denies it. The issuer bank transmits a response to the proprietary transaction processing network indicating its decision. The proprietary transaction processing network forwards the response to the acquirer bank, which in turn, forwards the response to the point-of-sale terminal.

The clearing & settlement process begins with clearing, which, in turn, begins when the point-of-sale terminal, or other merchant processing device, transmits sales draft information (e.g., account numbers and amounts) to the acquirer bank. The acquirer bank formats the sales draft information into a clearing message that it transmits to the proprietary transaction processing network. The network transmits the clearing message to the issuer bank, which calculates settlement obligations of the issuer bank, processing fees, and the amount due the acquirer bank. Settlement begins when the issuer bank transmits funds to a designated bank of the proprietary transaction processing network, which, after processing, transfers the funds to the acquirer bank.

In an alternate credit card transaction processing system, the proprietary transaction network is owned by a single issuer bank. Thus, in contrast with the previously described system, the alternative system includes only one issue bank, not a large number of issuer banks, and, as such, the issuer bank's functions and the proprietary transaction network functions previously discussed are merged. In this alternate system, the processing of the single issuer is less than the multiple issuer system but creates a processing bottleneck due to the single issuer.

Regardless of the type of credit card transaction processing system, such systems provides consumers, whether individuals, small companies, or large corporate entities, an easy mechanism for paying for goods and/or services. For instance, many businesses use credit cards to purchase goods and/or services from a variety of suppliers as part of their procurement and payment processes. While businesses use credit cards to purchase goods and services, they also use other forms of payment as part of their procurement and payment processes. For example, a business may purchase goods and/or services using a check, a wire transfer, and/or an automated clearing house (ACH) debit account.

Software programs have been developed to assist businesses with their procurement and payment processes. Such software programs include provisions for tracking inventory, generating purchase orders, requesting invoices, and initiating and tracking payments for the desired goods and/or services. Once a payment is initiated, depending on the type of payment, it is processed outside of the software via the appropriate system. For example, a credit card transaction is processed as discussed above. After the payment is made, it is reconciled and the reconciled payment information is provided back to the business, or to its software. While this approach reduces the burdens on a business to purchase and pay for goods and/or services, it still requires a fair amount of input from the business to initiate payments, track them, and process the reconciled data.

Recently, proprietary transaction processing network providers have partnered with procurement and payment software entities to further reduce the burdens of a business by integrating the procurement and payment software with credit card payment processing. Such integration provides relatively seamless payment for goods and/or services being purchased with a credit card. Further, in a single issuer system, the system is capable of processing payments made via a check or an ACH debit account. As such, in a single issuer system, check payments and/or ACH debit account payments may be offered to the business.

While such advancements are reducing the payment and tracking burdens of a business, they are still somewhat disjointed, still require additional business involvement, and require involvement of the supplier financial chain (e.g., merchant, merchant's bank, etc.). For instance, in the integrated credit card payment system, the business still needs to process transactions using other forms of payment, which involves the supplier financial chain. In the single issuer system, the business is limited to using a credit card issued by the provider of the single issuer system, which dramatically limits payments options.

Therefore, a need exists for a method and apparatus that provides for seamless payment for goods and/or services regardless of the type of payment and/or the type of proprietary transaction processing network.

BRIEF DESCRIPTION OF THE SEVERAL VIEWS OF THE DRAWINGS

FIG. 5 is a diagram of an example of a payables profile in accordance with the present invention;

FIG. 6 is a diagram of an example of an accounts payable data file in accordance with the present invention;

FIG. 7 is a diagram of an example of creating payment data from a payables profile and an accounts payable data file in accordance with the present invention;

DETAILED DESCRIPTION OF THE INVENTION

Figure 1:
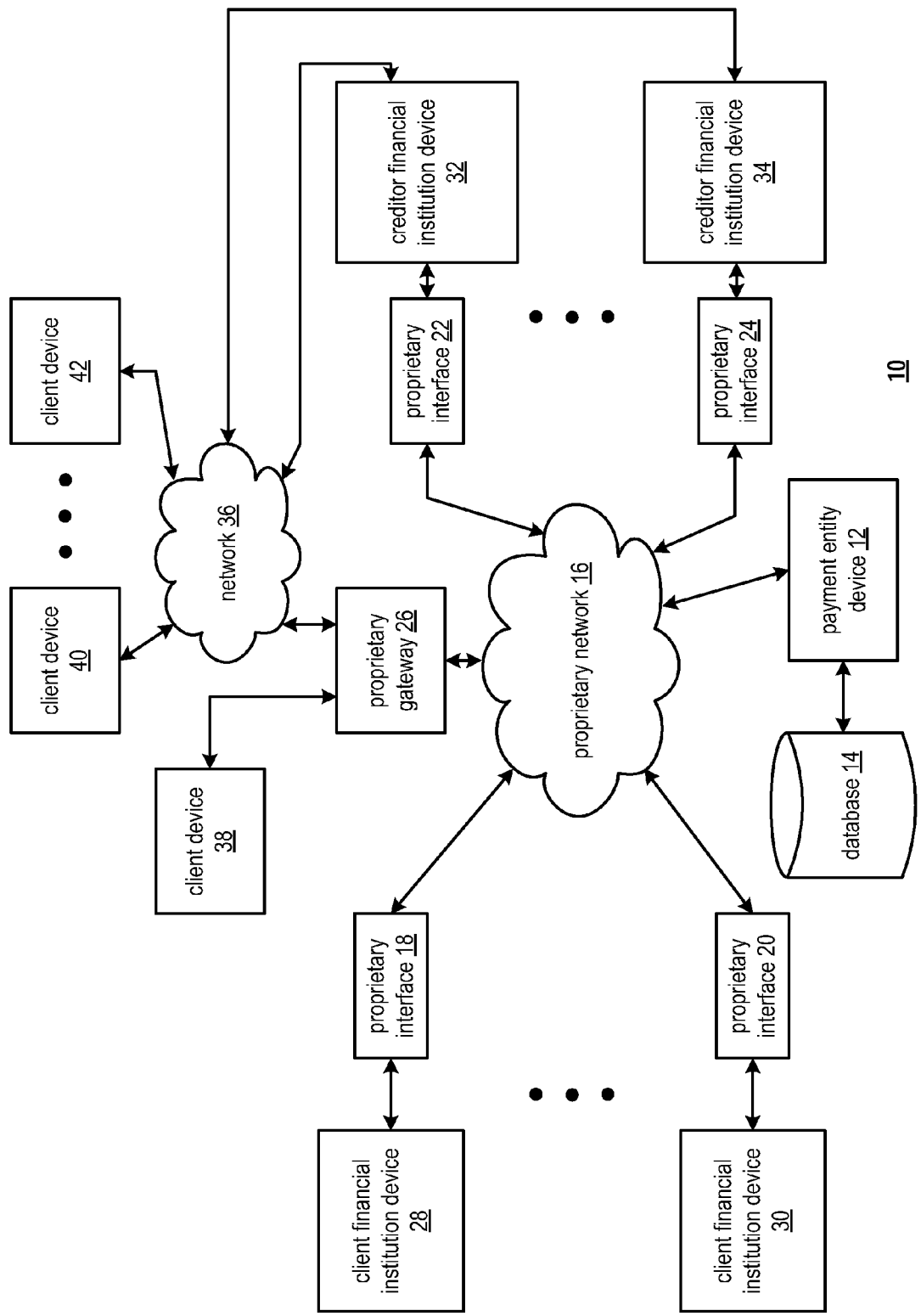
FIG. 1 is a schematic block diagram of an embodiment of a system in accordance with the present invention.

FIG. 1 is a schematic block diagram of an embodiment of a system 10 that includes a payment entity device 12, a database 14, a proprietary transaction processing network 16, a plurality of proprietary interfaces 18-24, a proprietary gateway 26, a plurality of client financial institution devices 28-30, a plurality of creditor financial institution devices 32-34, a network 36 (e.g., the internet), and a plurality of client devices 38-42.

The payment entity device 12, the database 14, and the proprietary network 16 may be operated and maintained by a single entity to facilitate seamless payment and reconciliation of accounts payable regardless of the payment method on behalf of one or more clients (e.g., individuals, businesses, agencies, and/or other entities). For example, Visa, Inc. may provide its VisaNet® as the proprietary network 16 and have one or more computing devices (e.g., computers, servers, super computers, main frames, etc.) coupled to the proprietary network 16 to function as the payment entity device 12, and may have one or more databases 14 coupled thereto.

In general, a client, via its device 38-42, establishes an account with the payment entity (e.g., Visa, Inc.), via its device 12. The account includes a level of service (basic, level 1, etc.), identity of the client and its device 38-42, and a payables profile. The payables profile includes a list of creditors (suppliers, merchants, service providers, etc.) of the client, identification information of the creditors, and one or more preferred methods of paying debt owed to a creditor.

With the account established, the payment entity is ready to provide payment and reconciliation support for the client. This function commences when the client, via its device 38-42, provides an accounts payable data file to the payment entity device 12 via the proprietary gateway 26 (and optionally the network 36) and the proprietary network 16. The proprietary gateway 26 is a proprietary node, modem, bridge, etc., that serves as a connection point to the proprietary network 16, which ensures that only authorized entities have access to the proprietary network 16. Note that communications within the system 10 occur in accordance with the communication protocol (e.g., internet protocol, transmission control protocol, and/or a proprietary version thereof) of the proprietary network 16.

Upon receiving the accounts payable data file, the payment entity device 12 retrieves the payables profile of the client, which may be stored in the database 14. The payment entity device 12 determines a method of payment (e.g., credit card [e.g., credit card, debit card, charge card, stored-value card, prepaid card, Electronic Benefit Transfer card, card account and other types of issued cards or accounts], funds transfer [e.g., wire transfer, account transfer within same financial institution, etc.], commercial paper [e.g., check, promissory note, etc.], tangible consideration [e.g., rebate, refund, goods and/or service exchange, etc.], debit account [e.g., ACH, line or credit, etc.], and credit card [e.g., business, debit card, auto pay, single use, etc.]), amount of payment, payment date, and terms of payment for each account payable in the accounts payable data file based on the payables profile. Alternatively, for an account payable, the payment entity device 12 may determine a different method of payment that is more optimal (e.g., less costly to process, better payment terms, rebate offer, rewards offer, etc.) for the client.

For a given account payable, the payment entity device 12 initiates a payment on behalf of the client in accordance with the method of payment, the amount of payment, the payment date, and the payment terms by sending a payment request to a client financial institution device 28-30 that corresponds to the type of payment (e.g., issuer bank for a credit card payment, a bank for check payment, a bank for wire transfer, etc., which may be the same or different banks).

The client financial institution device 28-30 processes the payment request in accordance with the type of payment. For example, if the type of method is a credit card payment, the client financial institution device 28-30 assists in the clearing and settlement process with the creditor's financial institution device 32-34. As another example, if the type of payment is a check, the client financial institution device 28-30 determines whether the client has sufficient funds in its account to cover the amount due. If yes, the client financial institution device 28-30 generates a check, sends it to the creditor, and generates a transaction completed message, which includes the check number, amount, creditor, payment date, etc. The client financial institution device 28-30 sends the transaction complete message to the payment entity device 12.

The payment entity device 12 monitors the payments of the accounts payable, collects the payment responses from the various financial institution devices 28-30 and 32-34, reconciles payments of the accounts payable, and generates reports thereof. As an example, the payment entity device 12 generates a client statement report that indicates how and when the accounts payable have been paid. In this manner, the client, after setting up an account, merely transmits an accounts payable data file to the payment entity device 12 and receives a statement when the accounts are paid, with little or no interaction to facilitate the payments regardless of the payment type.

Figure 2:
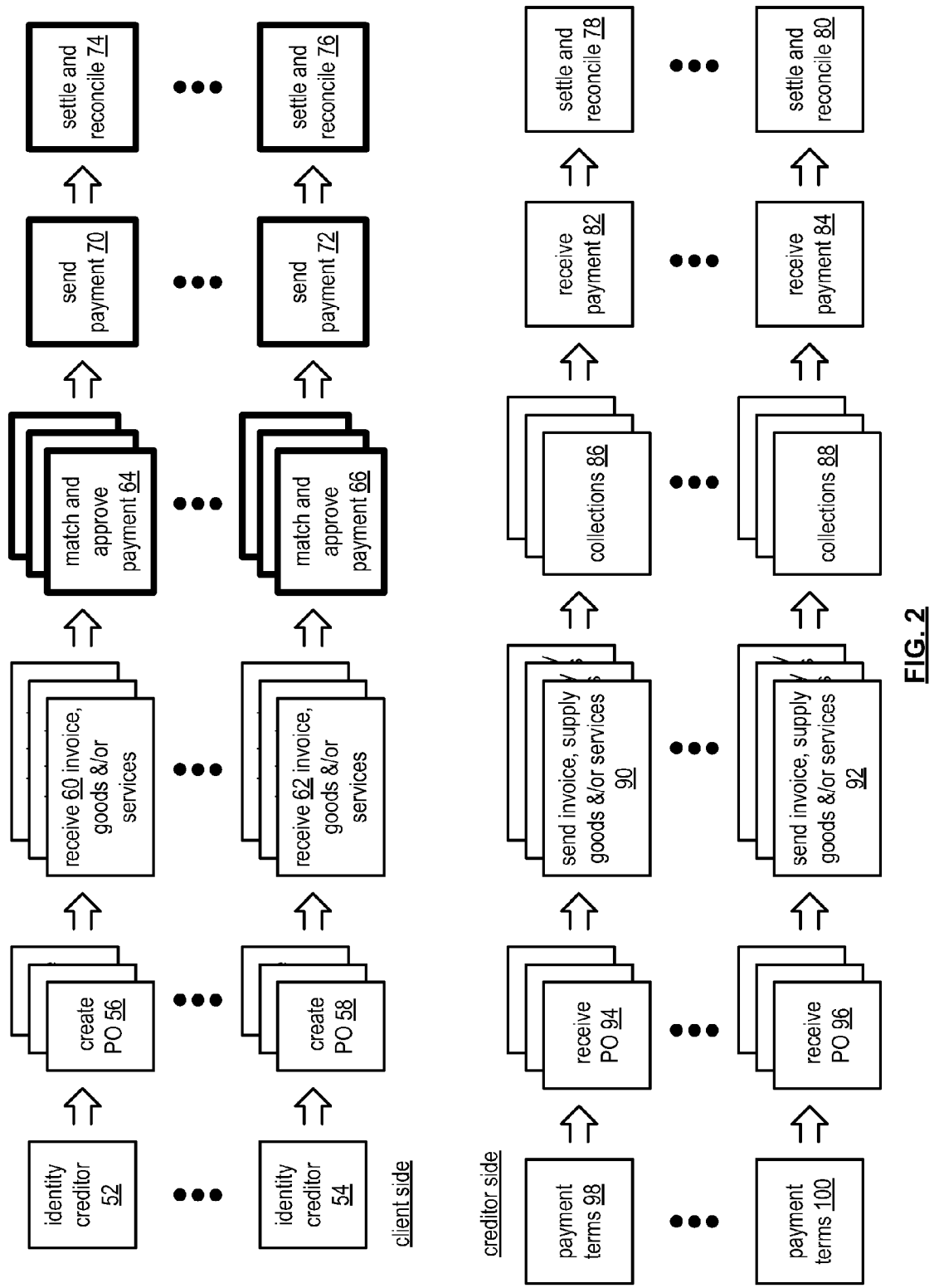
FIG. 2 is a diagram of an example of a payment and procurement process in accordance with the present invention.

FIG. 2 is a diagram of an example of a payment and procurement process that includes a client side and a creditor side. The client side includes identifying creditors (e.g., supplier, service provider, merchant, loan service, line of credit service, etc.) 52-54, creating purchase orders (PO) 56-58, receiving invoice for goods and/or services 60-62 per purchase order, match and approve payment 64-66 per purchase order, send payment 70-72 per purchase order or creditor, and settle and reconcile 74-76 each payment. The creditor side includes establish payment terms 98-100 for a client, receive purchase orders 94-96, send invoice for goods and/or services 90-92, generate collections (e.g., accounts receivable) 86-88, receive payments 82-84 for each purchase order or from a given client, and settle and reconcile payments 78-80. Note that the system of FIG. 1 supports the match and approve payment step 64-66, the send payment step 70-72, and/or the settle and reconcile step 74-76.

Figure 3:
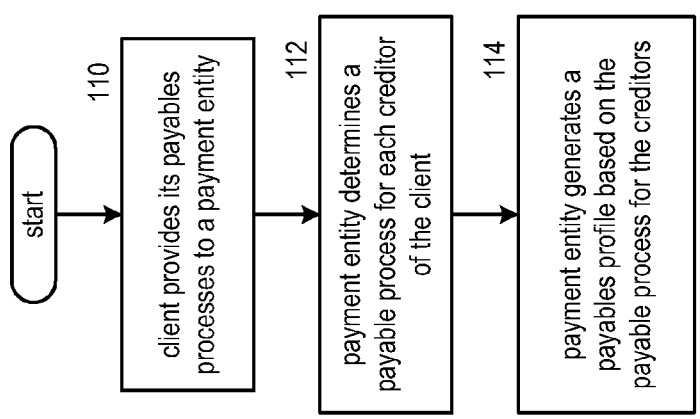
FIG. 3 is a logic diagram of an embodiment of a method for creating a payables profile in accordance with the present invention.

FIG. 3 is a logic diagram of an embodiment of a method for creating a payables profile that begins at step 110 where a client device 38-42 provides the client's payable processes to the payment entity device 12. The client's payables processes include identity of a creditor and, for each creditor, one or more preferred methods of payment (e.g., credit card, funds transfer, commercial paper, tangible consideration, debit account, and credit card), preferred payment terms, and identity of client's corresponding financial institution. Note that the client's payables processes may include more or less data. Further note that client's payables processes may include default information. For example, the default information may indicate a particular payment type for any non-specified creditor, may indicate a particular payment type for certain types of transactions regardless of creditor, may indicate a particular payment type for transactions greater than a certain value and another for transactions less than the certain value, may indicate, for a given payment type, to use a particular client financial institution, and/or may indicate to have the payment entity device to determine the payment method and/or client financial institution. As such, the client can provide as specific or as vague of guidelines as it desires as to how, when, and in what way its debts are to be paid.

The method then proceeds to step 112 where the payment entity determines a payables process for each creditor of the client based on the client's payables processes. For example, if the client provided a specific payables process for a specific creditor, then the payment entity stores this information for the specific creditor. As another example, if the client did not provide a specific payables process for a creditor, the payment entity may assign the default payment process or a payment entity identified payment process for the creditor. The method then proceeds to step 114 where the payment entity generates a payables profile for the client based on the payables processes for the creditors.

Figure 4:
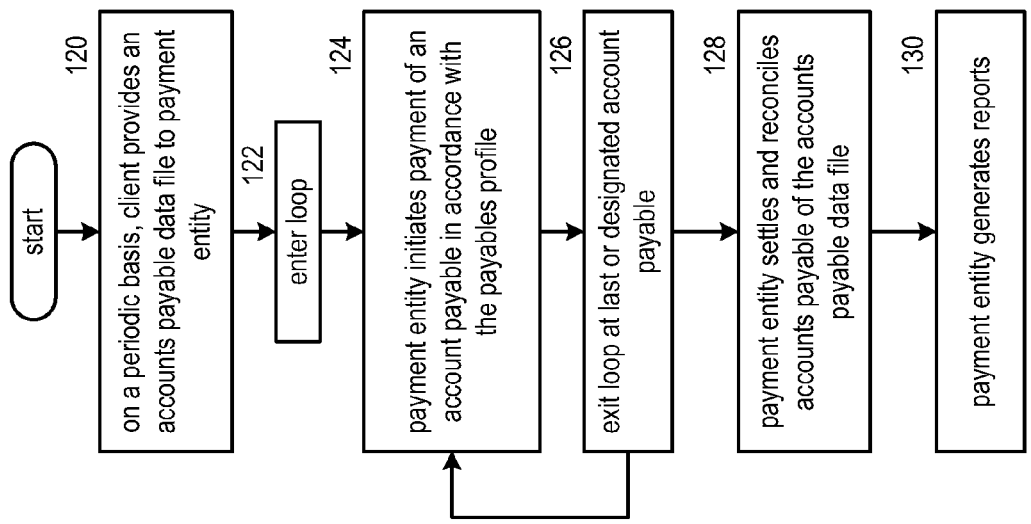
FIG. 4 is a logic diagram of an embodiment of a method for paying accounts payable in accordance with the present invention.

FIG. 4 is a logic diagram of an embodiment of a method for paying accounts payable that begins at step 120 where, on a periodic basis (e.g., weekly, bi-monthly, monthly, when initiated by the client), the client device 38-42 provides an accounts payable data file to the payment entity device 12. In an embodiment, the accounts payable data file includes, at a minimum, invoices from creditors of the client. The invoices may be arranged into a tabular form, or other form, and sorted based on creditor, item purchased, dollar amount, method of payment, and/or any other data point.

The method continues at step 122, where the payment entity device 12 enters a loop. Within the loop, the payment entity device 12 initiates a payment of an account payable in accordance with the payables profile at step 124. For example, for a given accounts payable, which may correspond to a single invoice from a given creditor or a group of invoices from the creditor, the payment entity device 12 accesses the payables profile with respect to the creditor. Based on the payment preferences specified in the payables profile, the payment entity device 12 generates a payment request and sends to the appropriate client financial institution. The payment entity device 12 remains in the loop unit the last or a designated account payable is reached at step 126. For example, the designated account payable may correspond to a cumulative total of payments being exceeded, a certain number of creditors, etc. Note that the payment initiation is being done without involvement of the creditor's financial institution as is typical in credit card transactions.

The method then continues at step 128 where the payment entity device settles and reconciles the accounts payable. For example, the payment entity device 12 receives payment notifications from the client's financial institutions, stores the payment notifications, and reconciles the payment notifications with the accounts payable. The method then continues at step 130 where the payment entity device 12 generates reports regarding the payment of the accounts payable. The payment entity device 12 may generate a report for the client, for itself, for the client's financial institution(s), and/or the creditor's financial institution(s).

FIG. 5 is a diagram of an example of a payables profile 140 that includes a plurality of fields. The fields may include more or less of a creditor field, an accounts payable type field, a payment method field, a payment terms field, and a financial institution field. In an embodiment, the payment entity device 12 stores, for the creditors of the client, the preferred payment method, payment terms, and financial institution for various types of accounts payable. The preferences may be provided by the client without input from the payment entity, may include input from the payment entity, or derived by the payment entity.

As shown for a given creditor, accounts payable may be grouped and have different payment preferences. For example, Supplier ABC has two groupings of accounts payable type: the first being any goods and/or services that have a purchase price greater than a specified price and goods in category 1. The specified price could be a per-item price or a cumulative price. For goods and/or services that exceed this price, the preferred payment method is a credit card, which should be paid net-30 from the date of an invoice, and to use one or more of the credit cards the client has that is/are issued from Bank "A".

For goods that fall into category 1 (e.g., office supplies, etc.), the preferred method of payment is a line of credit with Bank "A". In the case where goods of category 1 are purchased and exceed the price threshold, a hierarchical approach may be applied to determine which payment method to use. For example, in this instance, use the first preferred method.

For all other goods and/or services that are not within category 1 and have a price less than the threshold, the payment entity device 12 will use a default payment approach. The client may specify the default method or the payment entity device 12 may determine the default method.

As another example, Supplier B has indicated that all of its accounts payables are to be paid using a wire transfer, with payment terms it specifies in the account payable data file, and the funds should come from Bank "A". As yet another example, Supplier DEF has numerous account payable categories, each with a different payment preference. As shown, services of category 1 are to be paid using a debit account, services of category 2 are to be paid using a check, goods of category 1 are to be paid using a credit card, goods of category 2 are to be paid with tangible consideration (e.g., a credit, exchange of goods and/or services, etc.), and a loan payment is to be made using a wire transfer.

As a further example, Supplier D has two classifications for its accounts payable: one for accounts payable incurred between a first and second date and a second for accounts payable incurred subsequent to the second date. In this example, all accounts payable incurred between the first and second dates are to be paid using a promissory note from a venture capitalist (VC) "1". For accounts payable incurred after the second date, a credit card is to be used. Also, payments on the promissory note are to be made using a check from an account with Bank "B".

FIG. 6 is a diagram of an example of an accounts payable data file 150 created from a plurality of invoices. In an embodiment, the invoices may stored and provided as the accounts payable data file 150. In another embodiment as shown, the invoices are tabulated to create the data file 150.

In this example, each invoice includes supplier identification information (e.g., name, address, creditor's financial institution, etc.), the items purchased, the quantity of items purchased, the unit cost of the items purchased, a subtotal, taxes, shipping and handling, and a total. On a per creditor basis, or some other basis (e.g., amount, item, etc.), the data is tabulated. In addition, the accounts payable data file may include an additional field to indicate with a particular account payable is to be paid in accordance with the payable profile or with an alternate payment process. In this example, invoice 2001 is to be paid using a check with a net-45 payment term.

FIG. 7 is a diagram of an example of creating payment data 152 from a payables profile 150 and an accounts payable data file 140 for a given creditor (e.g., supplier DEF). The payables profile 140 is a repeated from FIG. 5 for Supplier DEF and the account payable data file 150 is repeated from FIG. 6 for Supplier DEF with the addition of invoices 2002 and 2003. From these two data files, the payment entity device 12 generates the payment data 152, which is used to create payment requests that are sent to the appropriate financial institutions of the client.

For example, with respect to invoice 2001, the processing entity device 12 reviews the accounts payable data file 150 for this invoice to identify the invoice date, the item purchased, the purchase price, tax, shipping & handling, and if an alternate payment method is indicated. In this instance, there is an alternate payment method. As such, for invoice 2001, the payment entity device 12 generates the payment data to include the invoice number (e.g., 2001), the invoice date (e.g., Jan. 1, 2008), the item (e.g., AAA), the account payable type (e.g., Services—Category 1), the total price (e.g., $508.40, assuming tax and shipping & handling costs are being paid along with the purchase prices and not being paid using a different payment method), the payment method (e.g., check per the accounts payable file instead of a debit account as indicated in the payables profile), the payment terms (e.g., net 45 per the accounts payable data file), the financial institution identity (e.g., Bank "B" per the accounts payable data file instead of Bank "A" per the payables profile), and the payment date (e.g., Feb. 15, 2008, 45 days from the invoice date).

As another example, with respect to invoice 2002, the processing entity device 12 reviews the accounts payable data file 150 for the relevant information. In this instance, there is no alternate payment method. As such, for invoice 2002, the payment entity device 12 generates the payment data to include the invoice number (e.g., 2002), the invoice date (e.g., Jan. 2, 2008), the item (e.g., XXX), the account payable type (e.g., Services—Category 2), the total price (e.g., $50.76, assuming tax and shipping & handling costs are being paid along with the purchase prices and not being paid using a different payment method), the payment method (e.g., check per payables profile), the payment terms (e.g., net 30 per the payables profile), the financial institution identity (e.g., Bank "B" per the payables profile), and the payment date (e.g., Feb. 2, 2008, 30 days from the invoice date).

The payment entity device 12 generates the payment data 152 for invoice 2003 and 2004 in a similar manner as it generated the payment data 152 for invoice 2001. Note that since the payables profile and the accounts payable data file did not indicate payment terms for goods ZZZ purchase via invoice 2003, the payment entity device 12 initiates payment on a date it selects. In this example, the payment entity device 12 was programmed to select the date on which the data is compiled, however, it could be programmed to select any date or interval from the corresponding invoice date.

In this example, the payment entity device 12 also generates payment data 152 for a loan that the client has with Supplier DEF. The loan could be a line of credit, a loan, or some other form of monetary advancement. The payment data 152 for the loan indicates that $500.00 is to be wired from Bank "A" to Supplier DEF's account on the date the data is created.

Figure 8:
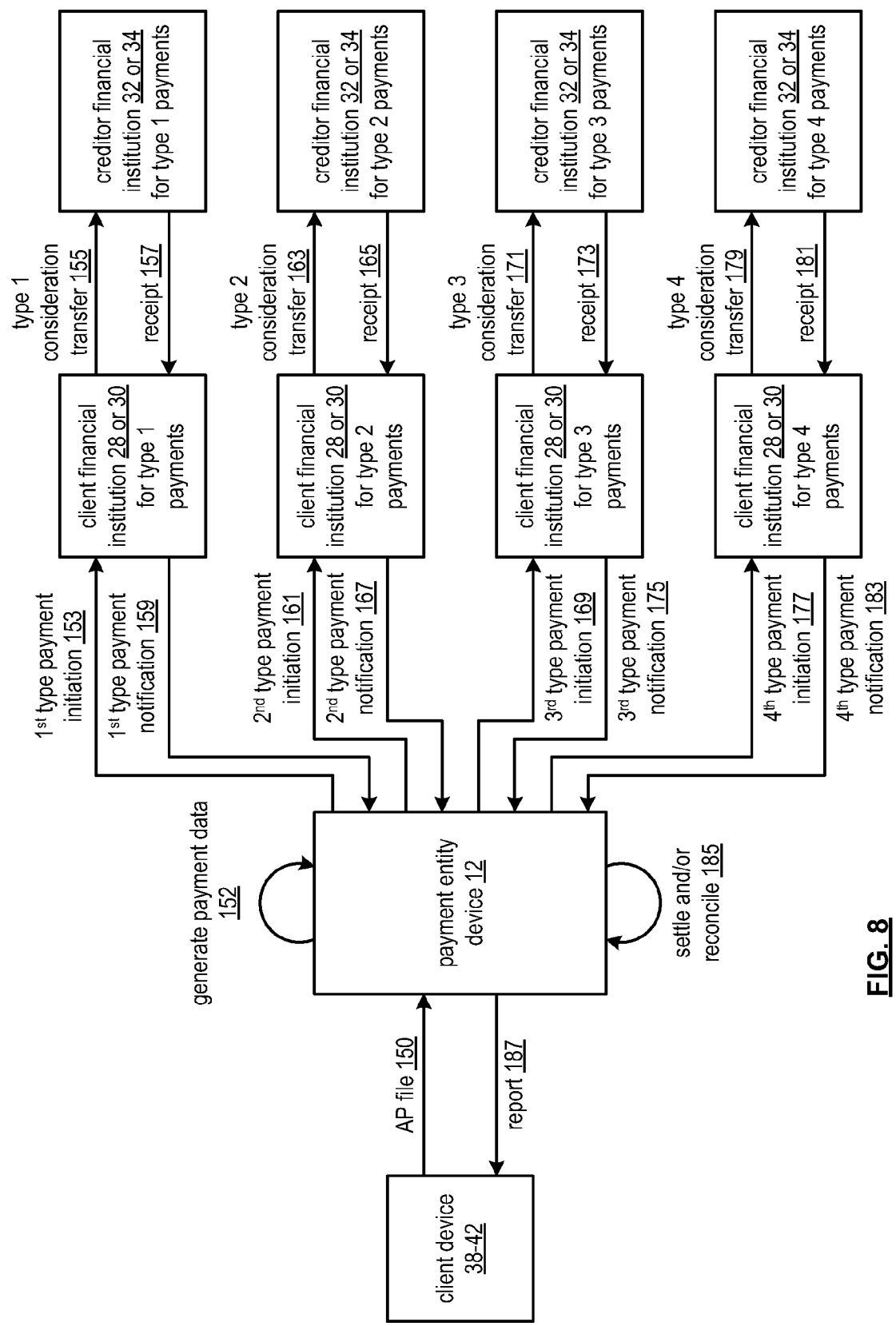
FIG. 8 is a schematic block diagram of an example of payment of accounts payable via a system in accordance with the present invention.

FIG. 8 is a schematic block diagram of an example of payment of accounts payable via the system 10 of FIG. 1. In this example, the client device 38-42 transmits an accounts payable data file 150 to the payment entity device 12. The payment entity device 12 processes the account payable data file 150 in accordance with the payables profile 140 for the client to generate the payment data 152.

The payment entity device 12 analyzes the payment data 152 on an per entry basis to determine a type of payment (e.g., credit card, funds transfer, commercial paper, tangible consideration, or debit account). When the type of payment is a first type, the payment entity device 12 transmits a $1^{st}$ type payment initiation request 153 to a client financial institution 28 or 30 that processes the $1^{st}$ type of payments. Assuming the payment is approved, the client financial institution 28 or 30 transfers the $1^{st}$ type of consideration 155 (e.g., funds transfer, check, line of credit, etc.) to a creditor financial institution 32 or 34 that processes the first type of payment. Upon crediting the $1^{st}$ type of consideration to the appropriate creditor's account, the creditor's financial institution 32 or 34 transmits a receipt of payment 157 to the client financial institution 28 or 30. The client financial institution 28 or 30 processes the receipt 157 to produce a $1^{st}$ type of payment notification 159. The client financial institution transmits the notification 159 to the payment entity device 12.

When the type of payment is a second type, the payment entity device 12 transmits a $2^{nd}$ type payment initiation request 161 to a client financial institution 28 or 30 that processes the $2^{nd}$ type of payments. Assuming the payment is approved, the client financial institution 28 or 30 transfers the $2^{nd}$ type of consideration 163 (e.g., funds transfer, check, line of credit, etc.) to a creditor financial institution 32 or 34 that processes the second type of payment. Upon crediting the $2^{nd}$ type of consideration to the appropriate creditor's account, the creditor's financial institution 32 or 34 transmits a receipt of payment 165 to the client financial institution 28 or 30. The client financial institution 28 or 30 processes the receipt 165 to produce a $2^{nd}$ type of payment notification 167. The client financial institution transmits the notification 167 to the payment entity device 12.

When the type of payment is a third type, the payment entity device 12 transmits a $3^{rd}$ type payment initiation request 169 to a client financial institution 28 or 30 that processes the $3^{rd}$ type of payments. Assuming the payment is approved, the client financial institution 28 or 30 transfers the $3^{rd}$ type of consideration 171 (e.g., funds transfer, check, line of credit, etc.) to a creditor financial institution 32 or 34 that processes the third type of payment. Upon crediting the $3^{rd}$ type of consideration 171 to the appropriate creditor's account, the creditor's financial institution 32 or 34 transmits a receipt of payment 173 to the client financial institution 28 or 30. The client financial institution 28 or 30 processes the receipt 173 to produce a $3^{rd}$ type of payment notification 175. The client financial institution transmits the notification 167 to the payment entity device 12.

When the type of payment is a fourth type, the payment entity device 12 transmits a $4^{th}$ type payment initiation request 177 to a client financial institution 28 or 30 that processes the $4^{th}$ type of payments. Assuming the payment is approved, the client financial institution 28 or 30 transfers the $4^{th}$ type of consideration 179 (e.g., funds transfer, check, line of credit, etc.) to a creditor financial institution 32 or 34 that processes the fourth type of payment. Upon crediting the $4^{th}$ type of consideration 179 to the appropriate creditor's account, the creditor's financial institution 32 or 34 transmits a receipt of payment 181 to the client financial institution 28 or 30. The client financial institution 28 or 30 processes the receipt 181 to produce a $4^{th}$ type of payment notification 183. The client financial institution transmits the notification 183 to the payment entity device 12. Note that the client financial institution that processes the first, second, third, and fourth types of payments may be the same financial institution, different institutions, or multiple financial institutions with at least one processing at least two types of payments. For example, a client may have a checking account and credit card with a first bank and having a line of credit and a debit account from a second bank.

As the payment entity device 12 receives the notifications 159, 167, 175, and/or 183, it stores them and processes 185 them to settle and reconcile the accounts payable. When this process is complete, or at any desired level of completion (e.g., on a per accounts payable basis up to all of the accounts payable in the accounts payable data file 150), the payment entity device 12 generates a report 187 regarding payment of the accounts payable and sends it to the client device 38-42. In such a system, the client sends its accounts payable information to the payment entity, which handles the payment, tracking, and reporting of paying the accounts payable with little or no further involvement of the client.

Figure 9:
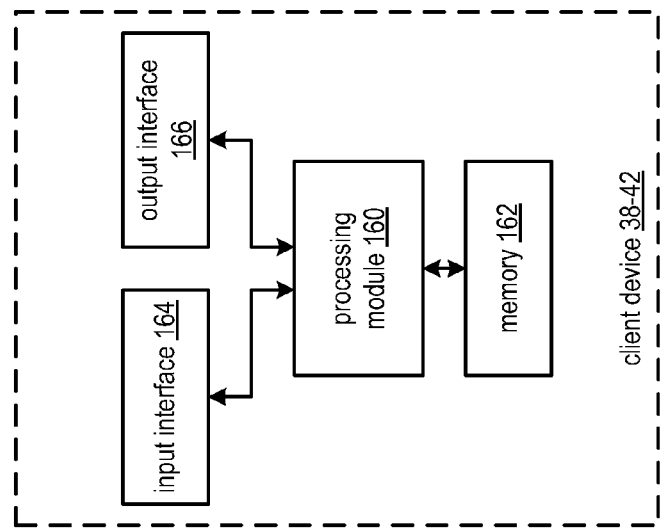
FIG. 9 is a schematic block diagram of an embodiment of a client device in accordance with the present invention.

FIG. 9 is a schematic block diagram of an embodiment of a client device 38-42 that includes a processing module 160, memory 162, an input interface 164, and an output interface 166. In an embodiment, the client device 38-42 is a computer or similar processing device. In such an embodiment, the processing module 160 includes a central processing unit; the memory 162 includes system memory, cache memory, and read only memory; the input interface 164 includes a graphical user interface and/or a peripheral device interface (e.g., to connect to a mouse, a keyboard, etc.); and the output interface 166 includes a video card, printer card, etc. Note that, while not shown, the client device 38-42 includes a network interface module such that the client device can access the network 36 and further includes a proprietary network module to enable access to the proprietary network 16.

In general, the processing module 160 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 160 may have internal memory and/or is coupled to memory 162. Memory 162 and internal memory may each be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the internal memory and/or memory 162 stores, and the processing module 160 executes, hard coded and/or operational instructions corresponding to at least some of the steps and/or functions illustrated in FIGS. 1-17.

Figure 10:
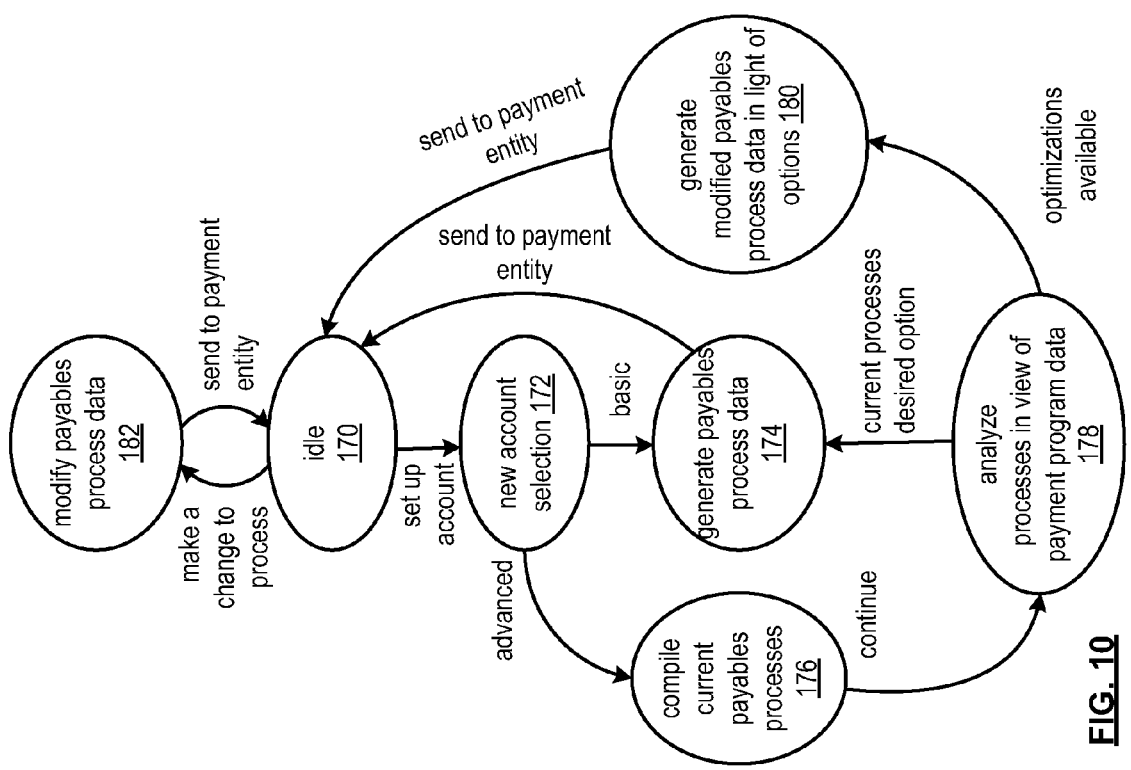
FIG. 10 is a state diagram of an embodiment of generating payables processing data in accordance with the present invention.

FIG. 10 is a state diagram of an embodiment of generating payables processing data that begins with the client device 38-42 in an idle state 170. The client device 38-42 transitions to a new account selection state 172 when the client device receives a request to set up a new account. The request may be received via the input interface 164 as a graphical user interface (GUI), a touch screen selection, a drop down menu selection, a point and click mouse operation, and/or any other mechanism of selecting an option an a computer screen.

In the new account state 172, the client device 38-42 determines whether the type of account to be set up is a basic account or an advanced account. When the new account is a basic account, the client device 38-42 transitions to a generate payables process data state 174. In this state, the client device 38-42 collects information regarding each creditor (e.g., supplier, merchant, lending institution, etc.) that is to be included in the payables process data. The information regarding a creditor includes one or more of, but is not limited to, creditor's name, creditor's address, creditor's account information, preferred payment method for paying debt owed to the client, client's financial institution information associated with type of payment, preferred payment terms, and types of items (e.g., goods and/or services) purchased from the creditor. The payables process data may further include a default payables process for unspecified creditors and/or for items purchased from a creditor that falls outside a specified payables process. Once the payables process data is generated, the client device 38-42 transmits it to the payment entity device 12 and transitions back to the idle state 170.

When the new account is an advanced account, the client device 38-42 transitions to a compile current payables process data state 176. In this state, the client device functions as in state 174 to generate the payables process data. When this data is compiled, the client device transitions to an analyze processes in view of payment program data state 178. In this state 178, the client device compares a creditor's payables process, for one to all of its creditors, with a data file containing payment programs offered by various financial institutions. If a payment program provides a more optimal payment solution (e.g., has a lower processing fee, lower interest rate, better rewards program, better payment terms, etc.), the client device may elect to use the payment program for a given client in place of the current payables process. Note that the payment entity compiles payment programs from a variety of financial institutions, where a payment program may be interest rates, payment terms, processing fees, bonuses, rewards, etc. associated with a credit card, a debit card, a debit account, a line of credit, and/or other forms of tangible consideration.

When the client device completes the analysis at state 178, it transitions to state 174 when the current payable processes are the desired options. If payable process optimizations are available, the client device transitions to state 180. In state 180, the client device generates modified payables process data by replacing the current payable process for a given creditor with the more optimal payment program. When this is complete, the client device transmits the modified payables process data to the payment entity and transitions to the idle state 170.

Any time after the account is set up, the client device may make a change to the payables process data by transitioning to state 182. In state 182, the client device modifies the payable process for a given client to include a new payable process. The change may be initiated by the client device determining a more optimal payable process, by a change in the relationship with the creditor, by a desire to change to a different payables process, etc. When the client device has completed the modification(s), it transmits the modified payable process data (which could be the entire file or only the changed portions) to the payment entity and transitions back to the idle state 170.

Figure 11:
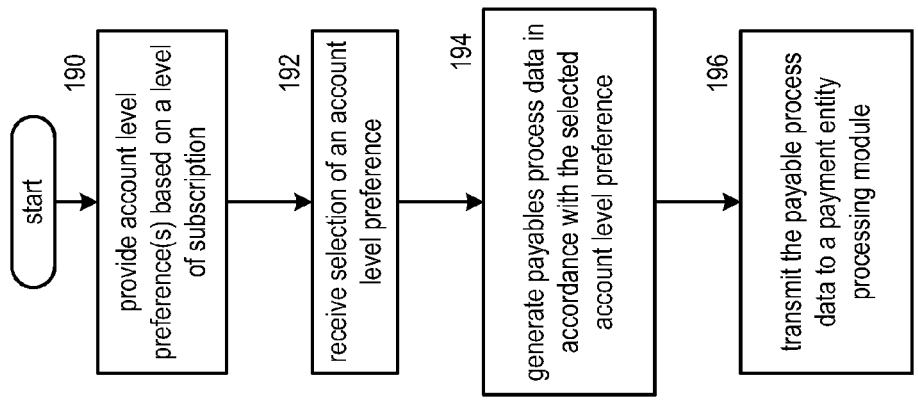
FIG. 11 is a logic diagram of an embodiment of a method for creating and transmitting payables processing data in accordance with the present invention.

FIG. 11 is a logic diagram of an embodiment of a method for creating and transmitting payables processing data that beings at step 190 where the client device provides at least one account level preference of a plurality of account level preferences based on a level of subscription. For example, the client device processing module generates a GUI that allows a user to select one of a plurality of account level preferences, which include a basic account, an advanced account and may further include additional account level preferences.

The method continues at step 192 wherein the client device receives a selection of one of the at least one of the account level preference to produce a selected account level preference. For example, the user of the client device may select a basic account. The method continues at step 194 where the client device generates payables process data in accordance with the selected account level preference. In an embodiment, the payables process data includes a list of a plurality of creditors and associated payment data. The payment data, for a creditor of the plurality of creditors, includes at least one payment scheme for paying at least a portion of debt owed to the creditor via at least one of: a business credit card, a funds transfer, commercial paper, tangible consideration, and a debit account. The method continues at step 196 where the client device transmits the payable process data to a payment entity device.

Figure 12:
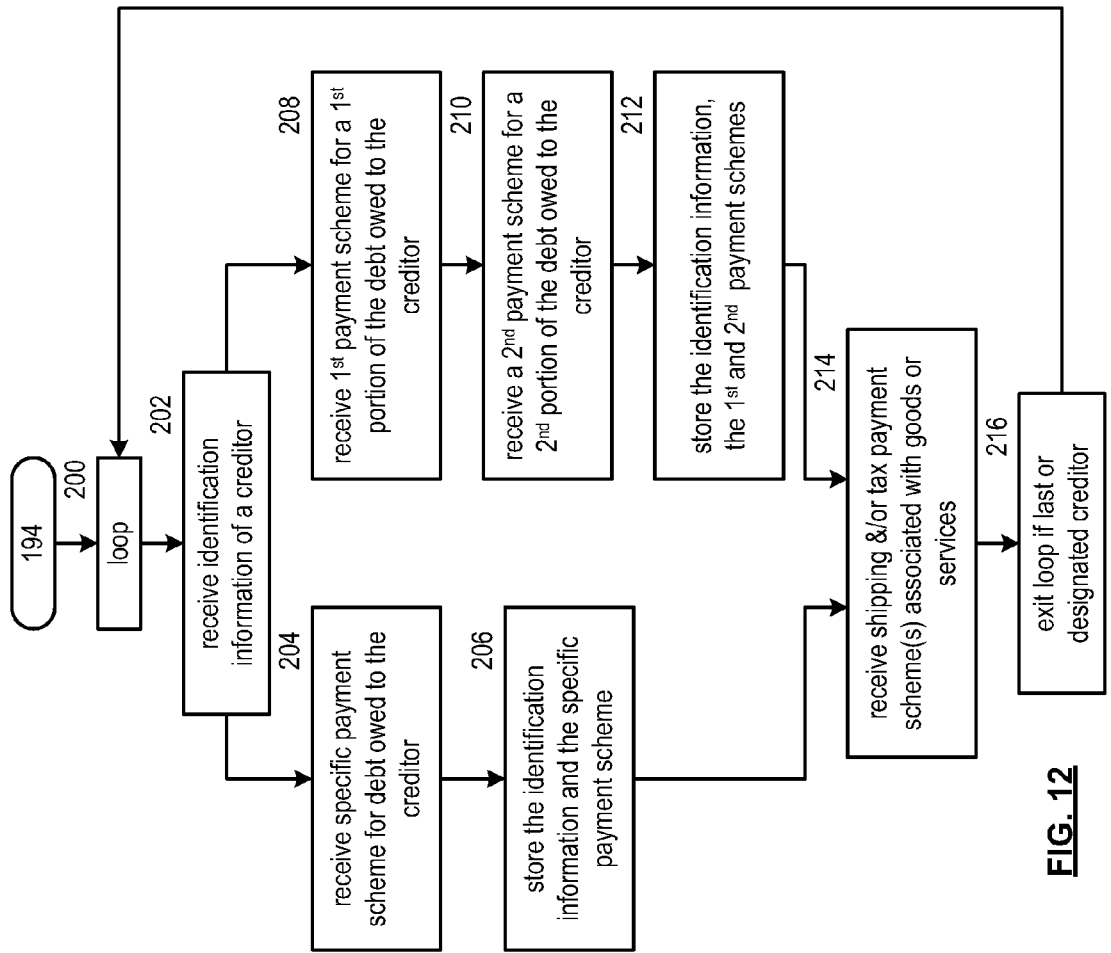
FIG. 12 is a logic diagram of an embodiment of a method for generating payables processing data in accordance with the present invention.

FIG. 12 is a logic diagram of an embodiment of a method for generating payables processing data of step 194 of FIG. 11. This method begins at step 200 where the client device enters a loop 200. While in the loop, the client device receives identification information of the creditor at step 202. The creditor identification information includes one or more, but is not limited to, creditor name, creditor address, and creditor account information. The loop then branches to either step 204 or step 208.

At step 204, the client device receives a specific payment scheme for the debt owed to the creditor as the associated payment data. For example, the specific payment scheme may include paying the debit owed to the creditor using a particular credit card, a particular type of credit card, a wire transfer, an account transfer, check, line of credit, a debit account, and/or other types of tangible consideration. The loop then continues at step 206 where the client device stores the identification information and the specific payment scheme as part of the payable process data.

At step 208, the client device receives a first payment scheme for a first portion of the debt owed to the creditor. In this instance, the first portion of the debt corresponds to at least one of: individual transactions below a value threshold, individual transactions purchased via a first purchasing mechanism, and individual transactions corresponding to a first category of services or goods. The loop then proceeds to step 210 where the client device receives a second payment scheme for a second portion of the debt owed to the creditor. Similarly, the second portion of the debt corresponds to at least one of: individual transactions at or above the value threshold, individual transactions purchased via a second purchasing mechanism, and individual transactions corresponding to a second category of services or goods. Note that the client device may receive the first and/or second payment scheme via a user interface of the client device.

The loop then proceeds to step 212 where the client device stores the identification information, the first payment scheme, and the second payment scheme as part of the payable process data. For example, of a given creditor, the client may desire to pay the creditor with a credit card if a purchase or group of purchases exceeds a certain dollar amount and pay with a check for purchases less than the certain dollar amount.

From either step 206 or 212, the loop continues at step 214 where the client device receives a shipping payment scheme for paying shipping costs as part of the associated payment data. This step may also include the client device receives a tax payment scheme for paying taxes associated with goods or services received from the creditor as part of the associated payment data. In this manner, the client may specify that the tax and/or shipping and handling of goods and/or services purchased from a creditor may be paid using a different payment scheme than used for paying for the goods and/or services. In a default mode, the taxes and shipping and handling costs would be paid using the same payment scheme as used to pay for the associated goods and/or services. The method then proceeds to step 216 where the client device repeats the loop for another creditor or exits the loop when the last creditor or a designated creditor is reached (e.g., a specific number of creditors).

Figure 13:
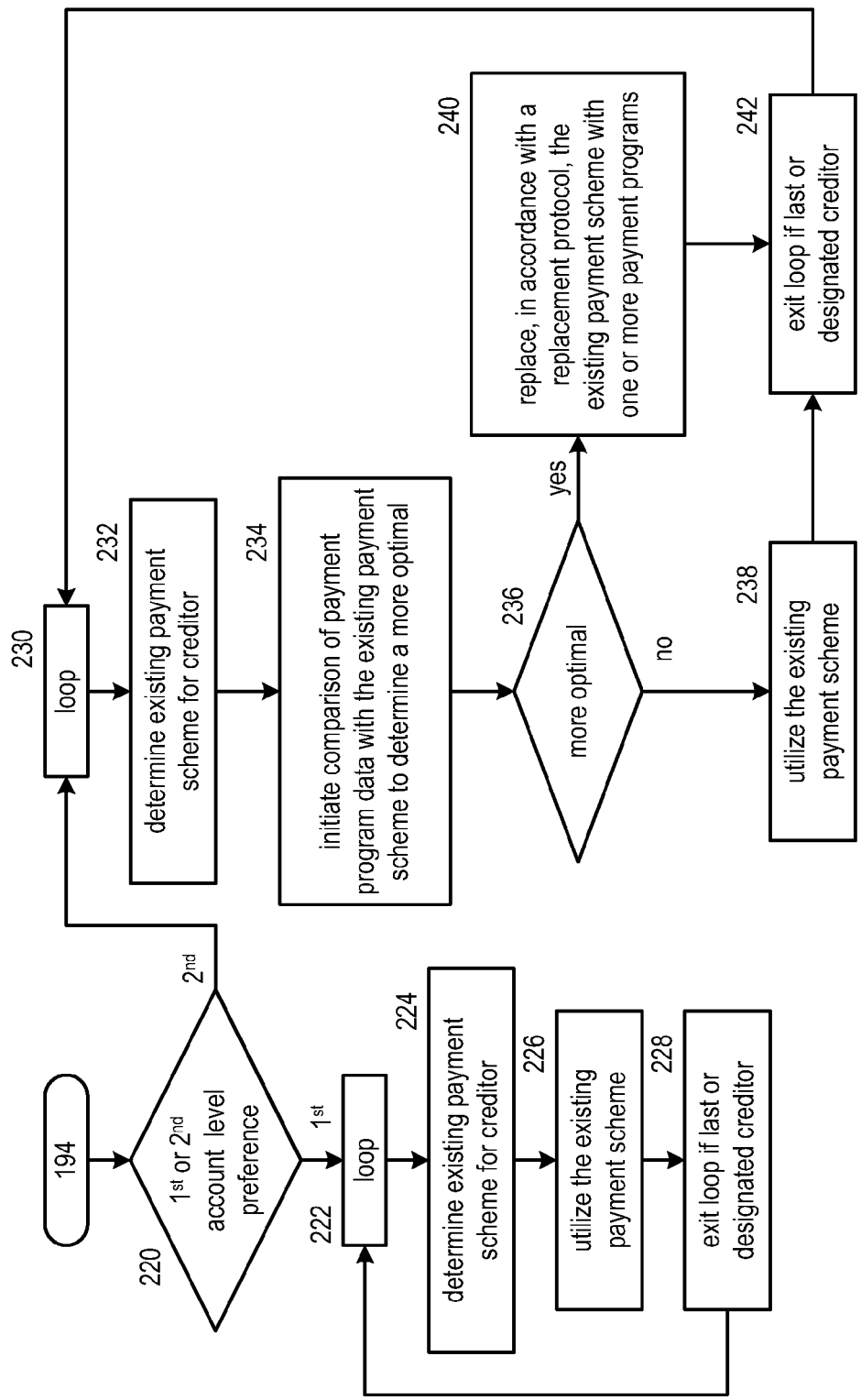
FIG. 13 is a logic diagram of another embodiment of a method for generating payables processing data in accordance with the present invention.

FIG. 13 is a logic diagram of another embodiment of a method for generating payables processing data of step 194 of FIG. 11. This method begins at step 220 where the client device determines whether the selected account level preference is a first or a second level (e.g., basic or advanced). When the account level preference is the first level (e.g., basic) the method proceeds to step 222 where the client device enters a loop. Within the loop, the client device determines an existing payment scheme for the creditor at step 224. The loop continues at step 226 where the client device utilizes the existing payment scheme as the associated payment data. For example, if the client device determines that the creditor is being paid with a credit card, then the payment scheme of the associated payment data for this creditor will be a credit card. At step 228, the client device either repeats the loop or exits the loop depending on whether the last or a designated creditor is reached.

If the selected account level preference corresponds to a second account level preference, the method proceeds to step 230 where the client device enters a loop. Within the loop, the client device determines an existing payment scheme for the creditor at step 232. The loop continues at step 234 where the client device initiates a comparison of payment program data with the existing payment scheme to determine whether one or more payment programs of the payment program data provides a more optimal payment solution than at least a portion of the existing payment scheme (e.g., lower processing fees, lower interest rate, better payment terms, better bonuses, etc.). The loop branches at step 236 depending on whether a more optimal payment scheme exists.

When a more optimal payment scheme does not exist, the loop continues at step 238 where the client device utilizes the existing payment scheme. When a more optimal payment scheme exists, the loop continues at step 240 where the client device replaces, in accordance with a replacement protocol, the at least a portion of the existing payment scheme in the payable process data with the one or more payment programs. The replacement protocol may include one or more of: receiving a GUI input to make the replacement, an automatic replacement feature, an automatic replacement feature if the optimization is greater than a threshold, etc. At step 242, the client device either repeats the loop or exits the loop depending on whether the last or a designated creditor is reached.

Figure 14:
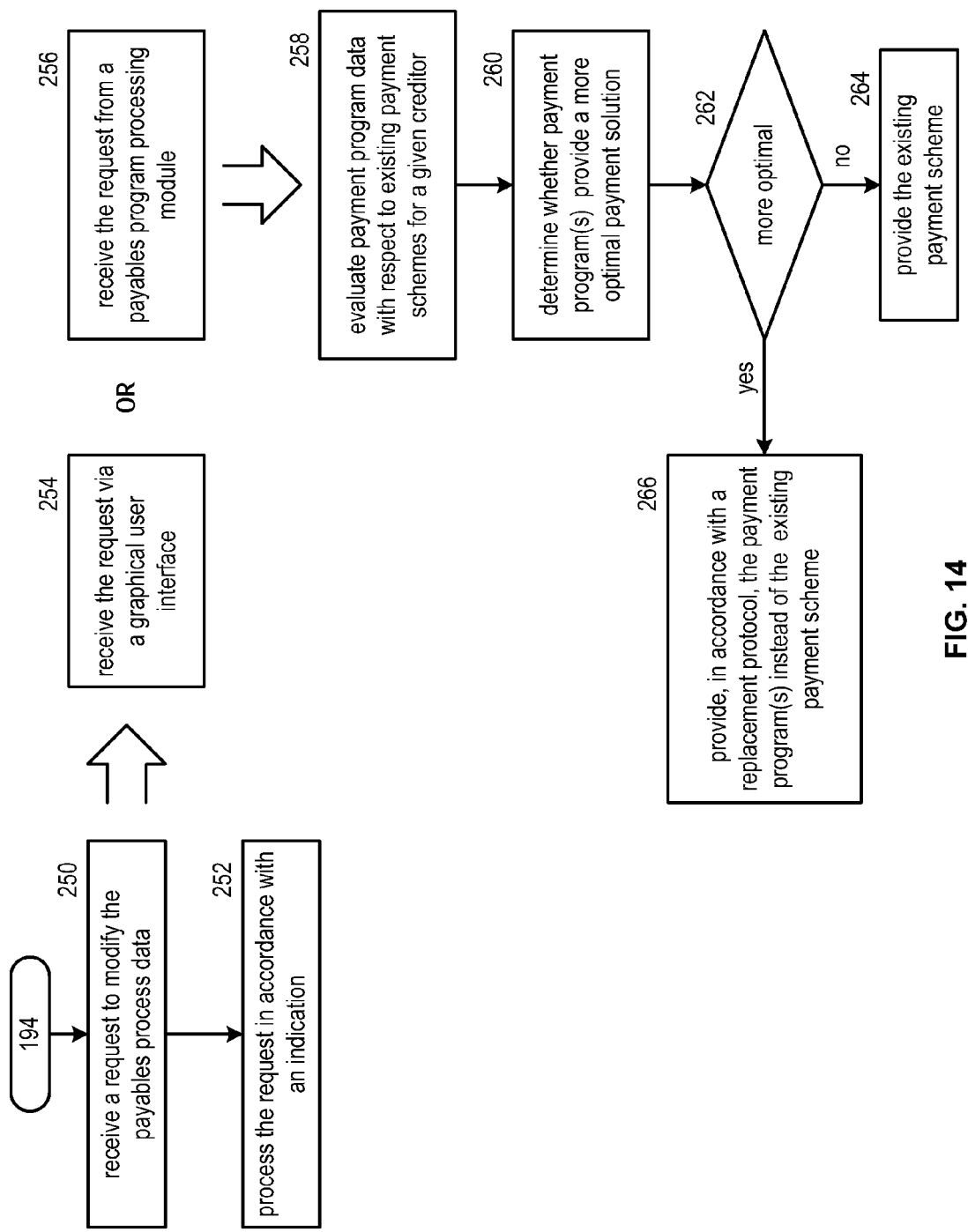
FIG. 14 is a logic diagram of another embodiment of a method for generating payables processing data in accordance with the present invention.

FIG. 14 is a logic diagram of another embodiment of a method for generating payables processing data of step 194 of FIG. 11. This method begins at step 250 where the client device receives a request to modify the payables process data. In an embodiment, the request includes an indication as to whether the modifying is adding a new creditor and its associated payment data, deleting an existing creditor and its associated payment data, and/or editing the associated payment data of an existing creditor. The method then proceeds to step 252 where the client device processes the request in accordance with the indication to produce the payables process data.

The receiving of the request of step 250 may done in a variety of ways. For example, the request may be received as per step 254 where the client device receives the request via a graphical user interface. As another example, the request may be received as per step 254 where the client device receives the request from a payables program processing module that functions to perform the steps 258-266. Note that the payables program processing module may be part of the processing module of the client device or a separate processing module.

At step 258, the payables program processing module evaluates payment program data with respect to existing payment schemes of the payable process data for a given creditor. The method continues to step 260 where the payables program processing module determines whether one or more payment programs of the payment program data provides a more optimal payment solution than at least a portion of the existing payment scheme. The method continues at step 262 and branches therefrom based on whether a more optimal payment solution exists.

When a more optimal payment solution does not exist, the method continues at step 264 where the payables program processing module provides the existing payment scheme. When a more optimal payment solution exists, the method continues at step 266 where the payables program processing module provides, in accordance with a replacement protocol, the one or more payment programs instead of the at least a portion of the existing payment scheme in the payable process data as at least part of the request.

Figure 15:
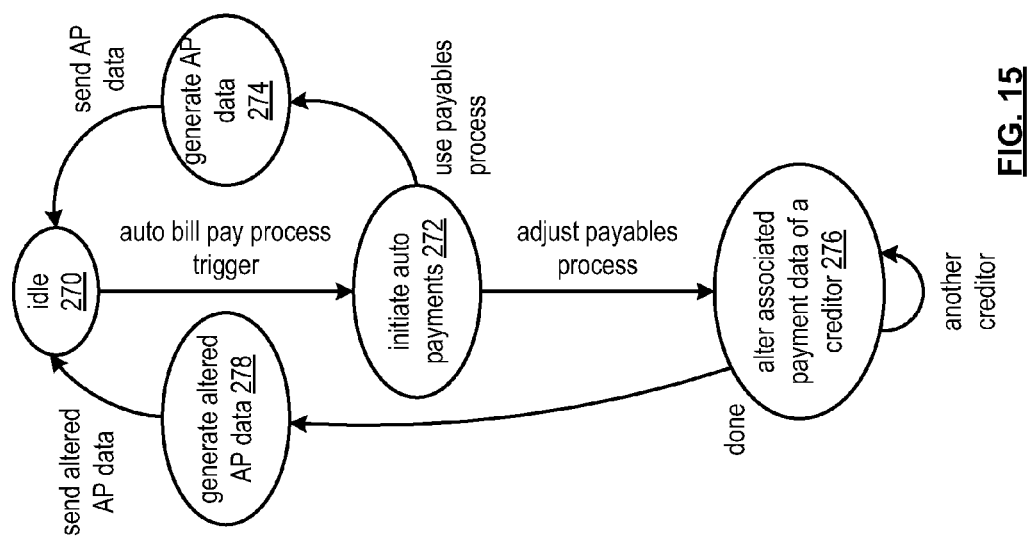
FIG. 15 is a state diagram of an embodiment of generating accounts payable data in accordance with the present invention.

FIG. 15 is a state diagram of an embodiment of generating accounts payable data that begins with the client device in an idle state 270. The client device transitions to an initiate auto payment state 272 when it detects an auto bill pay process trigger. The trigger may be a GUI input, expiration of a predetermined period of time from the previous auto pay cycle, a particular day of the week (e.g., Thursday), a particular date of the month (e.g., $1^{st}$, $15^{th}$, etc.), and/or any other time elapsing tracking scheme.

In the initiate auto payments state 272, the client device determines whether the existing payables processes are to be used for paying the current accounts payable or whether one or more of the payables processes is to be adjusted. When the existing payables processes are to be used, the client device transitions to a generate an accounts payable data file state 274. In general, the client device retrieves a plurality purchase orders and compiles them to produce the accounts payable data file. An example of this was provided in FIG. 6. After the client device has created the accounts payable data file, it sends the file to the payment entity device and transitions back to the idle state 270.

If one or more of the existing payables processes is to be adjusted, the client device transitions to an alter associated payment data of a creditor state 276. In this state, the client device generates an alternate payment scheme for each identified creditor that is to have the associated payables process adjusted. In an embodiment, a user may identify, via the input interface of the client device, the identity of a creditor that is have its payable processes adjusted and may further provide how the payables process is to be adjusted. In an alternate embodiment, the client device determines that a more optimal payment schemes exists and altering the payment data accordingly.

When client device has completed adjusting the payment data for one or more creditors, it transitions to generate altered accounts payable data state 278. An example of this was provided in FIG. 6. After the client device has created the altered accounts payable data file, it sends the file to the payment entity device and transitions back to the idle state 270.

Figure 16:
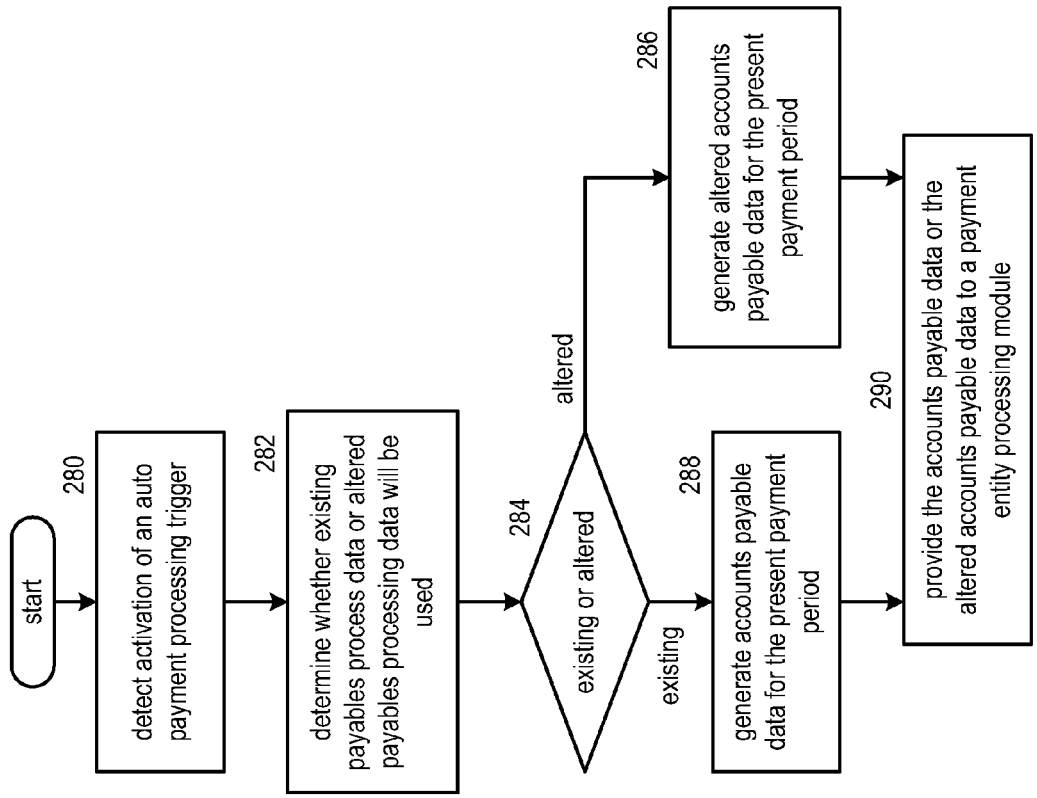
FIG. 16 is a logic diagram of an embodiment of a method for generating and providing accounts payable data in accordance with the present invention.

FIG. 16 is a logic diagram of an embodiment of a method for generating and providing accounts payable data that begins at step 280 where the client device detects activation of an auto payment processing trigger. The method continues at step 282 where the client device determines whether existing payables process data or altered payables processing data will be used for a present payment period when the auto payment processing trigger is activated. When existing data is to be used (in other words, the payment entity is to use the payables profile as is), the method continues at step 288 where the client device generates accounts payable data for the present payment period.

When existing data is to be altered (in other words, the payment entity is to use an alternate payment method for one or more accounts payable instead of the payment method indicated in the payables profile), the method continues at step 286 where the client device generates altered accounts payable data for the present payment period. The method continues from step 286 or step 288 at step 290 where the client device provides the accounts payable data or the altered accounts payable data to a payment entity device. Note that the generation of the accounts payable data may include at least one of: one or more invoice numbers, identification of the creditor, identification of one or more goods or services received from the creditor, payment amount for each of the one or more goods or services, and a payment date. Further note that the generation of the alternate accounts payable data to include at least one of: alternate associated payment data, one or more invoice numbers, identification of the creditor, identification of one or more goods or services received from the creditor, payment amount for each of the one or more goods or services, and a payment date.

Figure 17:
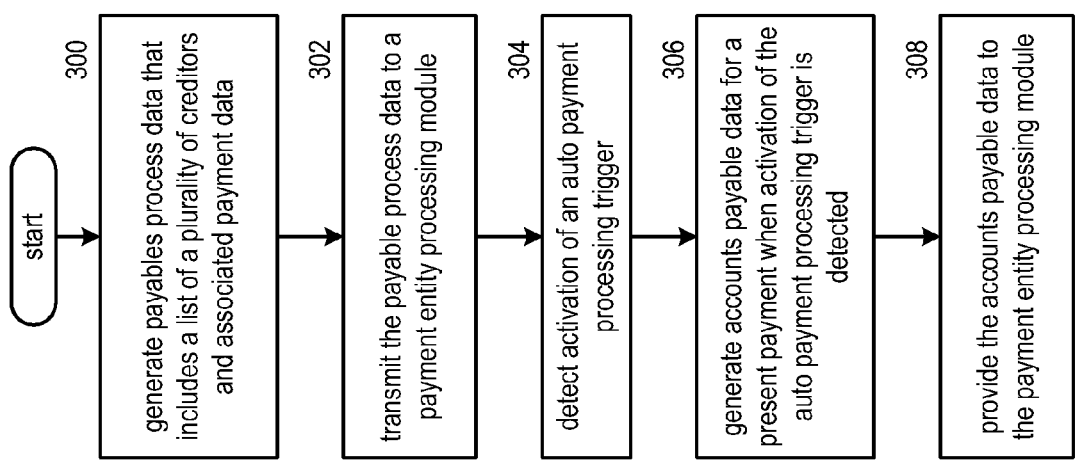
FIG. 17 is a logic diagram of another embodiment of a method for generating and providing accounts payable data in accordance with the present invention.

FIG. 17 is a logic diagram of another embodiment of a method for generating and providing accounts payable data that begins at step 300 where the client device generates payables process data. The payables process data includes a list of a plurality of creditors and associated payment data. The associated payment data includes, for a given creditor, at least one payment scheme for paying at least a portion of debt owed to the creditor via at least one of: a business credit card, a funds transfer, commercial paper, tangible consideration, and a debit account.

The method continues at step 302 where the client device transmits the payable process data to a payment entity device such that the payment entity may generate a payables profile for the client. The method continues at step 304 where the client device detects activation of an auto payment processing trigger. The method continues at step 306 where the client device generates accounts payable data for a present payment when the activation of the auto payment processing trigger is detected. The method continues at step 308 where the client device provides the accounts payable data to the payment entity device for payment in accordance with the payables process data.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for an automated accounts payable process, comprising:

receiving, at a client device that is operated by a client that pays a plurality of creditors, a selection of one of a plurality of account level preferences, wherein the selection includes one of a first account level preference and a second account level preference;

generating payables process data in accordance with the selected account level preference, wherein the generating comprises:

when the selected account level preference corresponds to a first account level preference:

determining one or more existing payment schemes for the plurality of creditors; and generating the payables process data, wherein the payables process data includes identification information and the one or more existing payment schemes for the plurality of creditors; and when the selected account level preference corresponds to a second account level preference:

determining the one or more existing payment schemes for the plurality of creditors;

generating the payables process data, wherein the payables process data includes the identification information and the one or more existing payment schemes for the plurality of creditors;

comparing a data file including a plurality of payment programs with the one or more existing payment schemes to determine whether one or more of the plurality of payment programs provides a more optimal payment solution than at least one of the one or more existing payment schemes;

when the one or more of the plurality of payment programs provides a more optimal payment solution than the at least one of the one or more existing payment schemes, replacing, in accordance with a replacement protocol, the at least one of the one or more existing payment schemes with a replacement payment scheme including the one or more of the plurality of payment programs in the payables process data;

transmitting, by the client device, the payables process data to a payment entity device that is configured to facilitate payment and reconciliation of accounts payable, wherein the payables process data for a single identified one of the plurality of creditors includes a first payment scheme for a first category of accounts payable with the single identified one of the plurality of creditors and a second payment scheme for a second category of accounts payable with the same single identified one of the plurality of creditors;

wherein the first payment scheme includes payment by at least one of: a credit card, a funds transfer, commercial paper, monetary consideration such as a rebate, refund, or exchange, and a debit account, and the second payment scheme includes payment by a different one of: the credit card, the funds transfer, commercial paper, monetary consideration such as the rebate, refund, or exchange, and the debit account; and wherein the first category of accounts payable portion includes at least one of: individual transactions at or above a value threshold, individual transactions corresponding to a first category of services or goods, and individual transactions corresponding to the second category of services or goods, and wherein the second category of accounts payable includes a different one of: individual transactions at or above the value threshold, individual transactions corresponding to the first category of services or goods, and individual transactions corresponding to the second category of services or goods.

2. The method of claim 1, wherein the transmitted payables process data further includes comprises at least one of:
   a shipping payment scheme for paying shipping costs for the single identified one of the plurality of creditors; and
   a tax payment scheme for paying taxes associated with goods or services received from the single identified one of the plurality of creditors.

3. The method of claim 1, further comprising:
   receiving, at the client device, a request to modify the payables process data, wherein the request includes an indication as to whether the modifying is adding a new creditor and one or more payment schemes associated with the new creditor, deleting an existing creditor and one or more payment schemes associated with the existing creditor, or editing the one or more payment schemes associated with the existing creditor;
   processing the request in accordance with the indication to generate the modified payables process data; and
   transmitting the modified payables process data to the payment entity device.

4. The method of claim 3, wherein receiving the request comprises at least one of:
   receiving the request via a graphical user interface; and
   receiving the request from a payables program processing module.

5. The method of claim 1, wherein the first account level preference corresponds to a basic account, and wherein the second account level preference corresponds to an advanced account.

6. The method of claim 5, wherein the plurality of payment programs included in the data file are provided by a plurality of financial institutions.

7. The method of claim 6, wherein the plurality of payment programs include interest rates, payment terms, processing fees, bonuses, and rewards for a plurality of payment methods.

8. A method comprising:
   receiving, at a client device that is operated by a client that pays a plurality of creditors, a selection of one of a plurality of account level preferences, wherein the selection includes one of a first account level preference and a second account level preference;
   generating payables process data in accordance with the selected account level preference, wherein the payables process data includes identification information and one or more payment schemes for the plurality of creditors, and wherein the payables process data for a single identified one of the plurality of creditors includes a first payment scheme for a first category of accounts payable with the single identified one of the plurality of creditors and a second payment scheme for a second category of accounts payable with the same identified one of the plurality of creditors;
   wherein the first payment scheme includes payment by a first method of payment and the second payment scheme includes payment by a second method of payment;
   wherein the first category of accounts payable includes at least one of: individual transactions at or above a value threshold, individual transactions corresponding to a first category of services or Roods, and individual transactions corresponding to a second category of services or goods, and wherein the second category of accounts payable includes a different one or: individual transactions at or above the value threshold, individual transactions corresponding to the first category of services or goods, and individual transactions corresponding to the second category of services or goods;
   transmitting the payable process data to a payment entity device that is configured to facilitate payment and reconciliation of accounts payable;
   detecting activation of an auto payment processing trigger at the client device for payment to one or more of a the plurality of creditors;
   generating accounts payable data at the client device for a present payment period, wherein the accounts payable data includes, for each of the one or more of the plurality of creditors, identification information, one or more invoice numbers corresponding to one or more invoices, a payment amount for each of the one or more plurality invoices, and a payment date for each of the one or more invoices;
   generating altered accounts payable data at the client device for the present payment period, wherein the altered accounts payable data includes, for the single identified one of the plurality of creditors, identification information, one or more invoice numbers corresponding to one or more invoices, a payment amount for each of the one or more plurality of invoices, a payment date for each of the one or more invoices, and an alternate method of payment for at least one of the one or more invoices; and
   transmitting the accounts payable data or the altered accounts payable data from the client device to the payment entity device for storage in a memory of the payment entity device.

9. The method of claim 8, wherein the generating the altered accounts payable data comprises:
- receiving the alternate method of payment for the at least one of the one or more invoices; and
- adding the alternate method of payment to the generated accounts payable data alternate associated payment data to generate the altered accounts payable data.

10. The method of claim 9, wherein receiving the alternate method of payment comprises at least one of:
- receiving the alternate method of payment via a graphical user interface; and
- receiving the alternate method of payment from a payables program processing module, wherein the payables program processing module functions to, for the present payment period:
  - compare a data file including a plurality of payment programs with the first and/or second payment schemes for the single identified one of the plurality of creditors, wherein the alternate method of payment is included in the plurality of payment programs;
  - determine whether the alternate method of payment provides a more optimal payment solution for the present payment period than the first and/or second payment schemes for the single identified one of the plurality of creditors; and
  - when the alternate method of payment provides a more optimal payment solution than the first and/or second payment schemes for the single identified one of the plurality of creditors, perform the adding of the alternate method of payment to the generated accounts payable data to generate the altered accounts payable data.

11. The method of claim 8, wherein the auto payment processing trigger comprises a time elapsing tracking scheme.

12. The method of claim 8, wherein the accounts payable data or the altered accounts payable data are transmitted in the form of an accounts payable data file including a creditor identification field, an invoice number field, an item field, a quantity field, a unit cost field, a subtotal field, a tax field, a shipping and handling field, a total field, and an alternate payment method field.

13. A method comprising:
- receiving, at a client device that is operated by a client that pays a plurality of creditors, a selection of one of a plurality of account level preferences, wherein the selection includes one of a first account level preference and a second account level preference;
- generating payables process data in accordance with the selected account level preference, wherein the generating comprises:
  - when the selected account level preference corresponds to a first account level preference:
    - determining one or more existing payment schemes for the plurality of creditors; and
    - generating the payables process data, wherein the payables process data includes identification information and the one or more existing payment schemes for the plurality of creditors; and
  - when the selected account level preference corresponds to a second account level preference:
    - determining the one or more existing payment schemes for the plurality of creditors;
    - generating the payables process data, wherein the payables process data includes the identification information and the one or more existing payment schemes for the plurality of creditors;
    - comparing a data file including a plurality of payment programs with the one or more existing payment schemes to determine whether one or more of the plurality of payment programs provides a more optimal payment solution than at least one of the one or more existing payment schemes;
    - when the one or more of the plurality of payment programs provides a more optimal payment solution than the at least one of the one or more existing payment schemes, replacing, in accordance with a replacement protocol, the at least one of the one or more existing payment schemes with a replacement payment scheme including the one or more of the plurality of payment programs in the payables process data;
- transmitting, by the client device, the payables process data to a payment entity device configured to facilitate payment and reconciliation of accounts payable, wherein the payables process data for a single identified one of the plurality of creditors includes a first payment scheme for a first category of accounts payable with the single identified one of the plurality of creditors and a second payment scheme for a second category of accounts payable with the same single identified one of the plurality of creditors;
- wherein the first payment scheme includes payment by at least one of: a credit card, a funds transfer, commercial paper, monetary consideration such as a rebate, refund, or exchange, and a debit account, and wherein the second payment scheme includes payment by a different one of: the credit card, the funds transfer, commercial paper, monetary consideration such as the rebate, refund, or exchange, and the debit account; and
- wherein the first category of accounts payable portion includes at least one of: individual transactions at or above a value threshold, individual transactions corresponding to a first category of services or goods, and individual transactions corresponding to the second category of services or goods, and wherein the second category of accounts payable includes a different one of: individual transactions at or above the value threshold, individual transactions corresponding to the first category of services or goods, and individual transactions corresponding to the second category of services or goods,
- detecting activation of an auto payment processing trigger at the client device;
- generating accounts payable data at the client device for payment to at least the single identified one of the plurality of creditors based on the payables process data when the activation of the auto payment processing trigger is detected; and
- transmitting the accounts payable data from the client device to the payment entity device for payment to at least the single identified one of the plurality of creditors in accordance with the first payment scheme for the first category of accounts payable and in accordance with the second payment scheme for the second category of accounts payable.

14. The method of claim 13, further comprising:
- receiving, at the client device, a request to modify the payables process data, wherein the request includes an indication as to whether the modifying is adding a new creditor and one or more payment schemes associated with the new creditor, deleting an existing creditor and one or more payment schemes associated with the existing creditor, or editing the one or more payment schemes associated with the existing creditor;

processing the request in accordance with the indication to generate the modified payables process data, and transmitting the modified payables process data to the payment entity device.

15. The method of claim 13, wherein the generated accounts payable data for the single identified one of the plurality of creditors includes identification information, one or more invoice numbers corresponding to one or more invoices, a payment amount for each of the one or more invoices, and a payment date for each of the one or more invoices, and wherein the method further comprises:

generating altered accounts payable data at the client device to include, for the single identified one of the plurality of creditors, the one or more invoice numbers, the identification information, the one or more invoice numbers corresponding to the one or more invoices, the payment amount for each of the one or more invoices, the payment date for each of the one or more invoices, and an alternate method of payment for at least one of the one or more invoices.

16. An apparatus comprising:

a processing module; and memory coupled to the processing module, wherein the processing module functions, at least partially in accordance with operating instructions stored in the memory, to:

receive a selection of one of a plurality of account level preferences, wherein the selection includes one of a first account level preference and a second account level preference;

generate payables process data in accordance with the selected account level preference, wherein the generating comprises:

when the selected account level preference corresponds to a first account level preference:

determining one or more existing payment schemes for a plurality of creditors; and generating the payables process data, wherein the payables process data includes identification information and the one or more existing payment schemes for the plurality of creditors; and when the selected account level preference corresponds to a second account level preference:

determining the one or more existing payment schemes for the plurality of creditors;

generating the payables process data, wherein the payables process data includes the identification information and the one or more existing payment schemes for the plurality of creditors;

comparing a data file including a plurality of payment programs with the one or more existing payment schemes to determine whether one or more of the plurality of payment programs provides a more optimal payment solution than at least one of the one or more existing payment schemes;

when the one or more of the plurality of payment programs provides a more optimal payment solution than the at least one of the one or more existing payment schemes, replacing, in accordance with a replacement protocol, the at least one of the one or more existing payment schemes with a replacement payment scheme including the one or more of the plurality of payment programs in the payables process data;

transmit the payables process data to a payment entity device, wherein the payables process data for a single identified one of the plurality of creditors includes a first payment scheme for a first category of accounts payable with the single identified one of the plurality of creditors and a second payment scheme for a second category of accounts payable with the same single identified one of the plurality of creditors;

wherein the first payment scheme includes payment by at least one of: a credit card, a funds transfer, commercial paper, monetary consideration such as a rebate, refund, or exchange, and a debit account, and the second payment scheme includes a different one of: the credit card, the funds transfer, commercial paper, monetary consideration such as the rebate, refund, or exchange, and the debit account; and wherein the first category of accounts payable includes at least one of: individual transactions at or above a value threshold, individual transactions corresponding to a first category of services or goods, and individual transactions corresponding to the second category of services or goods, and wherein the second category of accounts payable includes a different one of: individual transactions at or above the value threshold, individual transactions corresponding to the first category of services or goods, and individual transactions corresponding to the second category of services or goods.

17. The apparatus of claim 16, wherein the processing module further functions to:

receive a request to modify the payables process data, wherein the request includes an indication as to whether the modifying is adding a new creditor and one or more payment schemes associated with the new creditor, deleting an existing creditor and one or more payment scheme associated with the existing creditor, or editing the one or more payment schemes associated with the existing creditor;

process the request in accordance with the indication to generate the modified payables process data; and transmit the modified payables process data to the payment entity device.

18. The apparatus of claim 17, wherein the processing module further functions to receive the request by at least one of:

receiving the request via a graphical user interface; and receiving the request from a payables program processing module.

19. An apparatus comprising:

a processing module; and memory coupled to the processing module, wherein the processing module functions, at least partially in accordance with operating instructions stored in the memory, to:

receive a selection of one of a plurality of account level preferences wherein the selection includes one of a first account level preference and a second account level preference;

generate payables process data in accordance with the selected account level preference, wherein the payables process data includes identification information and one or more payment schemes for a plurality of creditors, and wherein the payables process data for a single identified one of the plurality of creditors includes a first payment scheme for a first category of accounts payable with the single identified one of the plurality of creditors and a second payment scheme for a second category of accounts payable with the same identified one of the plurality of creditors;

wherein the first payment scheme includes payment by a first method of payment and the second payment scheme includes payment by a second method of payment;

wherein the first category of accounts payable includes at least one of: individual transactions at or above a value threshold, individual transactions corresponding to a first category of services or Roods, and individual transactions corresponding to a second category of services or goods, and wherein the second category of accounts payable includes a different one or: individual transactions at or above the value threshold, individual transactions corresponding to the first category of services or goods, and individual transactions corresponding to the second category of services or goods;

transmit the payable process data to a payment entity device configured to facilitate payment and reconciliation of accounts payable;

detect activation of an auto payment processing trigger at the client device for payment to one or more of a the plurality of creditors;

generate accounts payable data at the client device for a present payment period, wherein the accounts payable data includes, for each of the one or more of the plurality of creditors, identification information, one or more invoice numbers corresponding to one or more invoices, a payment amount for each of the one or more plurality invoices, and a payment date for each of the one or more invoices;

generate altered accounts payable data at the client device for the present payment period, wherein the altered accounts payable data includes, for the single identified one of the plurality of creditors, identification information, one or more invoice numbers corresponding to one or more invoices, a payment amount for each of the one or more plurality of invoices, a payment date for each of the one or more invoices, and an alternate method of payment for at least one of the one or more invoices; and transmit the accounts payable data or the altered accounts payable data to the payment entity device.

20. The apparatus of claim 19, wherein the processing module further functions to generate the altered accounts payable data by:

receiving the alternate method of payment for the at least one of the one or more invoices; and adding the alternate method of payment to the generate accounts payable data to generate the altered accounts payable data.

21. The apparatus of claim 20, wherein the processing module further functions to receive the alternate method of payment by at least one of:

receiving the alternate method of payment via a graphical user interface; and receiving the alternate method of payment from a payables program processing module, wherein the payables program processing module functions to, for the present payment period:

compare a data file including a plurality of payment programs with the first and/or second payment schemes for the single identified one of the plurality of creditors, wherein the alternate method of payment is included in the plurality of payment programs;

determine whether the alternate method of payment one or more payment provides a more optimal payment solution for the present payment period than first and/or second payment schemes for the single identified one or the plurality of creditors; and when the alternate method of payment provides a more optimal payment solution than the first and/or second payment schemes for the single identified one of the plurality of creditors, perform the adding of the alternate method of payment to the generated accounts payable data to generate the altered accounts payable data.

* * * * *